United States Patent [19]

Ishida

[11] 4,448,164
[45] May 15, 1984

[54] INTAKE PASSAGE CONSTRUCTION FOR INTERNAL COMBUSTION ENGINES
[75] Inventor: Tokuzi Ishida, Hamamatsu, Japan
[73] Assignee: Suzuki Jidosha Kogyo Kabushiki Kaisha, Shizuoka, Japan
[21] Appl. No.: 430,066
[22] Filed: Sep. 30, 1982
[30] Foreign Application Priority Data
Nov. 13, 1981 [JP] Japan ................... 56-180981
[51] Int. Cl.³ .................................... F02B 15/00
[52] U.S. Cl. .............................. 123/432; 123/308; 123/430; 261/23 C
[58] Field of Search ............ 123/432, 308, 306, 430, 123/188 M, 585, 587, 339; 261/23 B, 23 C

[56] References Cited
U.S. PATENT DOCUMENTS 3,994,268 11/1976 Okunishi et al. ............. 261/23 B
4,263,882 4/1981 Tezuka et al. ................ 123/432
4,318,380 3/1982 Matsumoto ................... 123/308
4,336,779 6/1982 Semence ....................... 123/585
4,361,123 11/1982 Hori et al. .................... 123/585

Primary Examiner—Ira S. Lazarus
Assistant Examiner—R. S. Bailey
Attorney, Agent, or Firm—Flynn, Thiel, Boutell & Tanis

[57] ABSTRACT

An intake passage construction for an internal combustion engine has a primary intake passage for supplying an air-fuel mixture when the engine operates under a full range of loads and a secondary intake passage for supplying an air-fuel mixture when the engine operates under relatively high loads. A secondary slow fuel passage has a pair of fuel supply ports opening into the secondary intake passage, and a fuel drain passageway extends from one of the fuel supply ports and has a fuel discharge port opening into the primary intake passage. Ambient air can be introduced into the fuel drain passageway in response to a vacuum developed in the primary intake passage so that fuel can be drained from the secondary slow fuel passage to prevent vapor lock therein. The fuel discharge port of the fuel drain passageway may open into an induction pipe.

9 Claims, 4 Drawing Figures

INTAKE PASSAGE CONSTRUCTION FOR INTERNAL COMBUSTION ENGINES

BACKGROUND OF THE INVENTION

The present invention relates to an intake passage construction for an internal combustion engine having a two-barrel carburetor.

There have been known internal combustion engines having two-barrel carburetors including a primary intake passage for supplying an air-fuel mixture when the engine operates under a full range of loads and a secondary intake passage for supplying an air-fuel mixture when the engine operates under relatively high loads. Such an internal combustion engine has a secondary slow fuel passage having fuel supply ports opening into the secondary intake passage for smoothing transient engine operation when the secondary intake system comes into operation in addition to the primary intake system. In a practical range of engine operation, however, only the primary intake passage operates and no air-fuel mixture flows through the secondary intake passage. During such operation, fuel in the secondary slow fuel passage is evaporated with heat to thereby cause vapor lock in the secondary slow fuel passage. The vapor lock tends to prevent fuel from being supplied into the secondary intake passage when the latter is required to operate, resulting in hesitation and hence poor drivability. To solve this problem, there has been proposed to supply a portion of fuel from the secondary slow fuel passage into the primary intake passage or induction pipe at all times. With such an arrangement, however, large amounts of fuel are likely to be drawn off intermittently from the secondary slow fuel passage under the influences of intake pulsations and high vacuums developed in the primary intake passage when the engine is subjected to small loads. Fuel combustion thus becomes unstable in a range in which a small amount of fuel is to flow into the engine, with resulting poor drivability.

SUMMARY OF THE INVENTION

It is an object of the present invention to provide an intake passage construction for internal combustion engines which will improve transient conditions in which a secondary air-fuel mixture intake system comes into operation.

Another object of the present invention is to provide an intake passage construction for internal combustion engines which can supply a small amount of fuel stably in a range in which such a small amount of fuel is to flow into an engine cylinder.

Still another object of the present invention is to provide an intake passage construction for internal combustion engines which allows smoother drivability, consumes a smaller amount of fuel, and purifies the exhaust gas.

According to the present invention, an intake passage construction for an internal combustion engine having a combustion chamber comprises a primary intake passage opening into the combustion chamber for supplying an air-fuel mixture when the engine operates under a full range of loads, a secondary intake passage opening into the combustion chamber for supplying an air-fuel mixture when the engine operates under relatively high loads, a secondary throttle valve pivotably mounted in the secondary intake passage for controlling the flow of the air-fuel mixture through the secondary intake passage, a secondary slow fuel passage having a pair of fuel supply ports opening into the secondary intake passage adjacent to the secondary throttle valve, a fuel drain passageway communicating with one of the pair of fuel supply ports for discharging fuel from the secondary slow fuel passage, and means for introducing air into the fuel drain passageway in response to a vacuum developed in the primary intake passage. The fuel drain passageway has a fuel discharge port opening into the primary intake passage or an induction pipe. The last-mentioned means comprises a vacuum-operated valve actuatable under a vacuum delivered through a vacuum pickup port opening into the primary intake passage for introducing air through an air passage into the fuel drain passageway.

When an air flow is introduced into the fuel drain passageway, an amount of fuel is drained from the secondary slow fuel passage to thereby eliminate and prevent fuel vapor in the secondary slow fuel passage. Therefore, engine transient conditions are improved when the secondary intake passage comes into operation, and drivability is rendered smoother. Since the amount of fuel thus drained is proportional to a vacuum created in the primary intake passage, fuel can be stably supplied in a range of small fuel supply for correct combustion control for stable combustion. No abrupt supply of a large amount of fuel through the fuel drain passageway results in a linear air-fuel mixture, better fuel economy, and improved exhaust purification.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
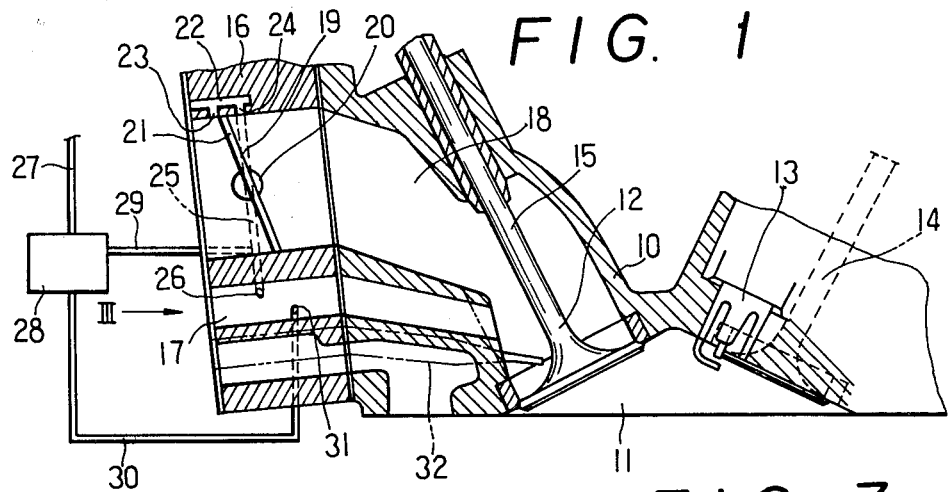
FIG. 1 is a fragmentary cross-sectional view of an internal combustion engine incorporating an intake passage construction according to the present invention.

As shown in FIG. 1, an internal combustion engine in which the present invention is incorporated includes a cylinder head 10 having a combustion chamber 11, an intake valve 12, an ignition plug 13, and an exhaust valve 14, the intake valve 12 having a stem 15 slidably supported by the cylinder head 10. A throttle block 16 is interposed between an intake manifold (not shown) and the cylinder head 10. The internal combustion engine has a two-barrel carburetor (not shown) to meet varying fuel supply demands under different engine load conditions. The throttle block 16 and the cylinder head 10 jointly define therein a primary intake passage 17 for supplying an air-fuel mixture into the combustion chamber 11 when the engine operates under a full range of loads, and a secondary intake passage 18 for supplying an air-fuel mixture into the combustion chamber 11 when the engine is subjected to relatively high loads. The stem 15 of the intake valve 12 extends through the secondary intake passage 18 in the cylinder head 10.

A secondary throttle valve 19 is pivotably mounted by a shaft 20 in the secondary intake passage 18 within the throttle block 16 and has an upper valve plate 21 which can be held against an inner wall surface of the throttle block 16 defining the secondary intake passage 18. A secondary slow fuel passage 22 extends from a carburetor float system (not shown) into the throttle block 16 and has a pair of fuel supply ports 23, 24 opening into the secondary intake passage 18. The supply port 23 is located upstream of the upper valve plate 21 of the secondary throttle valve 19 when it is fully closed, and the supply port 24 is located downstream of the upper valve plate 21 when it is fully closed, as best shown in FIG. 2.

Figure 2:
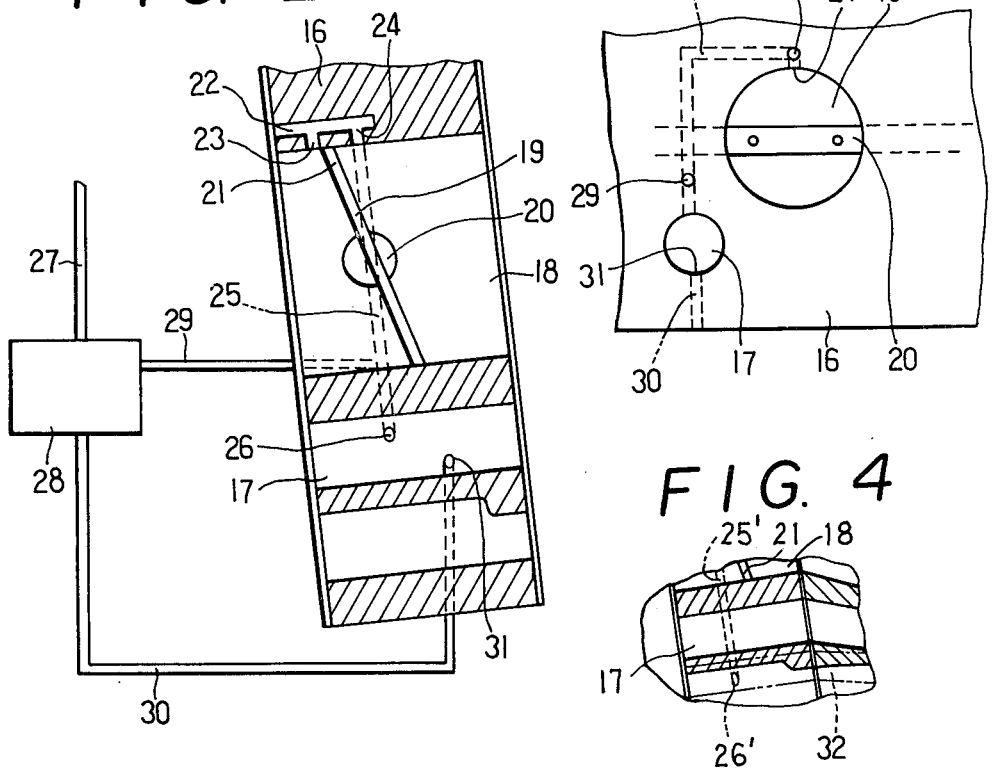
FIG. 2 is an enlarged fragmentary cross-sectional view of the intake passage construction shown in FIG. 1.
Figure 3:
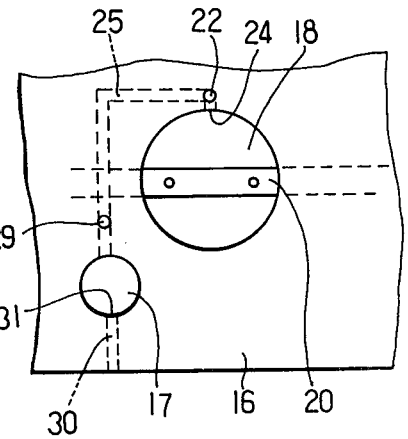
FIG. 3 is an elevational view as seen in the direction of the arrow III of FIG. 1.

As illustrated in FIGS. 2 and 3, the fuel passage 22 adjacent the port 24 also communicates with a vertical fuel drain passageway 25 which extends through the throttle block 16 and has a discharge port 26 opening into the primary intake passage 17. An air passage 27 extends from an air cleaner (not shown) to a vacuum-operated valve 28 from which extends an air passage 29 communicating with the fuel drain passageway 25. The vacuum-operated valve 28 has a vacuum chamber (not shown) held in communication with a vacuum signal passage 30 having a vacuum signal pickup port 31 opening into the primary intake passage 17. When the vacuum-operated valve 28 is actuated under a vacuum supplied from the vacuum signal pickup port 31 through the vacuum signal passage 30, the air passages 27, 29 are brought into mutual communication to introduce ambient air as filtered into the fuel drain passageway 25.

The above intake passage construction will operate as follows: When the engine operates under a low or medium range of loads, a vacuum is developed in the primary intake passage 17 and picked up by the vacuum signal pickup port 31, from which the vacuum is delivered through the vacuum signal passage 30 into the vacuum chamber in the vacuum-operated valve 28. The vacuum-operated valve 28 then connects the air passages 27, 29 together to supply a flow of external air into the fuel drain passageway 25. The air flow introduced into the fuel drain passageway 25 causes fuel to be continuously drawn in a small amount from the secondary slow fuel passage 22 via the port 24 and be drained into the primary intake passage 17 through the discharge port 26.

The fuel thus flowing through the secondary slow fuel passage 22 and the fuel drain passageway 25 clears away any fuel vapor generated in the secondary slow fuel passage 22 and also prevents fuel vapor from being created or collecting therein. Accordingly, the secondary slow fuel passage 22 suffers from no vapor lock, a condition which enables the secondary slow fuel passage 22 to be highly responsive under transient conditions in which the secondary intake passage 18 comes into operation in addition to the primary intake passage 17.

The amount of air flowing into the air passage 29 and hence into the fuel drain passageway 25 is proportional to the vacuum generated in the primary intake passage 17, and therefore the amount of fuel introduced through the fuel drain passageway 25 into the primary fuel passage 17 is dependent on the vacuum created therein. There is no danger of a large amount of fuel being drawn abruptly from the secondary slow fuel passage 22 under a high vacuum in the primary intake passage 17, or for intermittent streams of fuel being drawn from the secondary slow fuel passage 22 under vacuum pulsations. Rather, fuel supply from the secondary slow fuel passage 22 is rendered stable for ideal fuel combustion in a range in which a small amount of fuel is to be supplied into the combustion chamber 11.

Figure 4:
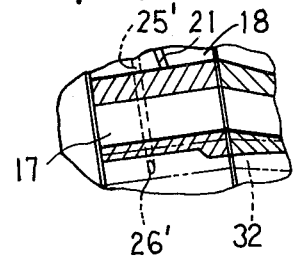
FIG. 4 is a fragmentary cross-sectional view showing a drain passageway according to another embodiment of the present invention.

According to another embodiment shown in FIG. 4, a fuel drain passageway 25' extends downwardly past the primary intake passage 17 and, instead of opening into passage 17, it instead has a fuel discharge port 26' opening into an induction pipe 32 having a distal end opening into the secondary intake passage 18 near the intake valve 12 as shown in FIG. 1.

The vacuum-operated valve 28 may be replaced with other known means for introducing ambient air into the fuel drain passageway 25 in response to a vacuum developed in the primary intake passage 17.

The fuel supply port 24 may be disposed upstream of the fuel supply port 23, or the fuel supply ports 23, 24 may be replaced wwith a pair of lateral branches from the secondary slow fuel supply passage 22 with one of such branches communicating with the fuel drain passageway 25.

Although certain preferred embodiments have been shown and described in detail, it should be understood that many changes and modifications may be made therein without departing from the scope of the appended claims.

What is claimed is:

1. An intake passage construction for an internal combustion engine having a combustion chamber, comprising:
   (a) a primary intake passage opening into the combustion chamber for supplying an air-fuel mixture when the engine operates under a full range of loads;
   (b) a secondary intake passage opening into the combustion chamber for supplying an air-fuel mixture when the engine operates under relatively high loads;
   (c) a secondary throttle valve pivotably mounted in said secondary intake passage for controlling the flow of the air-fuel mixture through said secondary intake passage;
   (d) a secondary slow fuel passage connected to a fuel supply and having a pair of fuel supply ports opening into said secondary intake passage adjacent to said secondary throttle valve;
   (e) a fuel drain passageway means communicating with one of said pair of fuel supply ports for discharging fuel from said secondary slow fuel passage to remove fuel vapors from the secondary slow fuel passage; and
   (f) means for introducing air into said fuel drain passageway means as a result of a vacuum developed in said primary intake passage.

2. An intake passage construction according to claim 1, wherein said fuel drain passageway means has a fuel discharge port opening into said primary intake passage.

3. An intake passage construction according to claim 1, including an induction pipe having a distal end opening into said secondary intake passage, said fuel drain passageway means having a fuel discharge port opening into said induction pipe.

4. An intake passage construction according to claim 1, wherein said air introducing means comprises a vacuum-operated valve, a vacuum signal passage having a vacuum signal pickup port opening into said primary intake passage and connected to said vacuum-operated valve for actuating the latter in response to a vacuum picked up through said vacuum signal pickup port, and an air passage connected to said vacuum-operated valve and communicating with said fuel drain passageway means for introducing air thereinto under the control of said vacuum-operated valve.

5. An intake passage construction according to claim 1, wherein said secondary throttle valve has a valve plate which can be held adjacent an inner wall surface defining said secondary intake passage when said secondary throttle valve is fully closed, one of said fuel supply ports being disposed upstream of said valve plate when said secondary throttle valve is fully closed, the other fuel supply port being disposed downstream of said valve plate when said secondary throttle valve is fully closed and being in communication with said fuel drain passageway means.

6. An intake passage construction according to claim 1, wherein said pair of fuel supply ports are positioned adjacent the upper edge of the throttle valve and said one fuel supply port is located downstream of the throttle valve.

7. An intake passage construction according to claim 1, wherein said air introducing means includes an air passage connected to said fuel drain passageway means for introducing air into said passageway means, said air passage having valve means associated therewith and operated in response to the vacuum in said primary intake passage for controlling flow of air through said air passage.

8. An intake passage construction according to claim 1, wherein the air introducing means introduces air into the fuel drain passageway means in response to the vacuum developed in the primary intake passage.

9. An intake passage construction according to claim 1, wherein the air introducing means introduces air into the fuel drain passageway means in proportion to the vacuum developed in the primary intake passage.

* * * * *